United States Patent

Förster et al.

[11] 4,056,176
[45] Nov. 1, 1977

[54] DRIVE ARRANGEMENT FOR MOTOR VEHICLES, ESPECIALLY FOR PASSENGER MOTOR VEHICLES, WITH AN AUTOMATIC CHANGE-SPEED TRANSMISSION

[75] Inventors: Hans-Joachim M. Förster; Hermann Gaus, both of Stuttgart, Germany

[73] Assignee: Daimler-Benz Aktiengesellschaft, Japan

[21] Appl. No.: 682,213

[22] Filed: May 3, 1976

[30] Foreign Application Priority Data

May 3, 1975 Germany .............................. 2519903

[51] Int. Cl.² ............................................. B60K 41/26
[52] U.S. Cl. ...................................... 192/4 A; 74/846
[58] Field of Search ................... 192/4 A, 3 R; 74/846

[56] References Cited

U.S. PATENT DOCUMENTS

| | | | |
|---|---|---|---|
| 3,426,624 | 2/1969 | Karig et al. ..................... | 192/4 A X |
| 3,752,275 | 8/1973 | Mueller .......................... | 192/4 A |

*Primary Examiner*—Edgar W. Geoghegan
*Attorney, Agent, or Firm*—Craig & Antonelli

[57] ABSTRACT

A drive arrangement for motor vehicles, especially for passenger motor vehicles, having an automatically shifting transmission and a mechanism for raising the idling rotational speed of the driving engine during a warm-up phase. The automatically shifting transmission includes a servo-device which, in a first position of a command slide valve, is adapted to be shifted into a position for a first speed range and, in a second position of the command slide valve, is adapted to be shifted into a position for a second speed range. A kickdown solenoid valve acting on the command slide valve is provided which, during actuation of a kick-down switch, passes over into a down-shifting position. A shifting-up relay opening, when energized, is connected in parallel with the kick-down switch whereby a switch is connected in the energizing circiuit of the shifting-up relay which closes the energizing circuit of the shifting-up relay upon actuation of a brake pedal in such a manner that the kickdown solenoid valve passes over into a shifting-up position during the actuation of the brake pedal.

8 Claims, 1 Drawing Figure

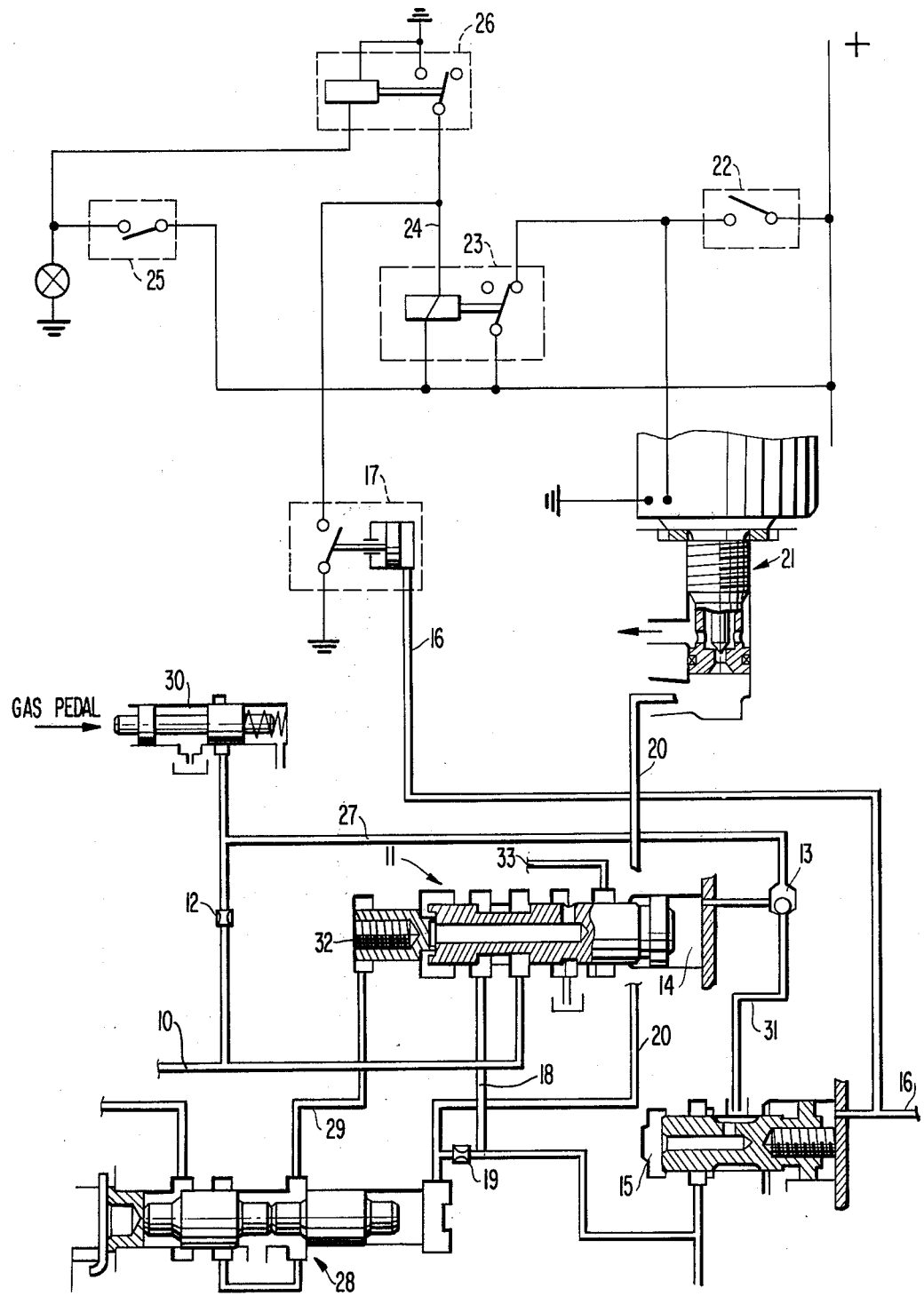

DRIVE ARRANGEMENT FOR MOTOR VEHICLES, ESPECIALLY FOR PASSENGER MOTOR VEHICLES, WITH AN AUTOMATIC CHANGE-SPEED TRANSMISSION

The present invention relates to a drive arrangement for motor vehicles, especially for passenger motor vehicles, with an automatically shifting transmission and with a mechanism for raising the idling rotational speed of the driving engine during a warm-up phase, with a servo-device, which in a first position of a command slide valve is adapted to be shifted into a position for a first speed and in a second position of the command slide valve is adapted to be shifted into a position for a second speed and with a kick-down solenoid valve acting on the command slide valve, which upon actuation of a kick-down switch passes over into a downshifting position.

The cooperation between an automatic transmission and the corresponding driving engine may lead to difficulties during an operating warm-up phase of the engine, i.e., when the engine warms up while running, if the rotational speed of the engine lies very high due to an automatic starting mechanism in Otto-engines or due to a raised idling speed in Diesel engines. If the automatic transmission is then engaged, there exists a very strong creeping tendency due to the raised engine speed during the warm-up phase. In order to bring such a vehicle to a halt or stoppage in this condition, for example, at road crossings, the driver has to brake disproportionately strongly. This again leads to an overbraking of the front wheels which renders the vehicle incapable of maneuvering in case of slippery roads, for example, in case of icy roads.

The present invention is therefore concerned with the task to provide an installation, by means of which an overbraking of the wheels in the creeping condition is avoided automatically during an actuation of the brake. The underlying problems are solved according to the present invention with drive arrangements of the type described hereinabove in that a shifting-up relay which opens when energized, is arranged in parallel with the kick-down switch, whereby a switch closing the energizing circuit of the shifting-up relay upon a actuation of a brake pedal is connected in the energizing circuit thereof in such a manner that the kick-down solenoid valve passes over into its shifting-up position during the actuation of the brake pedal.

The advantage is achieved with the installation according to the present invention that during the operating warm-up phase, i.e., during the phase with artificially raised engine rotational speed, the transmission shifts automatically to a higher speed upon actuation of the brake, i.e., the torque at the wheels is thus reduced. Consequently, a residual creeping tendency can be absorbed by a quite normal soft braking. An over-braking of the front wheels is therefore no longer possible also in case of slippery or icy roads. On the other hand, it is also possible to start driving in first speed with the proposed control system. This control system also avoids so-called shifting oscillations as would occur, for example, if the shifting-up were to be initiated only by taking away gas.

Automatically shifting transmissions are known in the art in which a kick-down solenoid valve forces a command slide valve 2/1 into a position for a first speed rauge during energization by means of a pressure relief at a control slide valve. It is proposed in detail by the present invention for such a transmission that a parallelly connected shifting-up relay closes, in a non-energized position, the energizing circuit of the kick-down solenoid valve and opens the same upon energization. Another feature of the present invention resides in that a switch actuated by the brake is connected in a first branch of an energizing circuit of the shifting-up relay and a second circuit is connected in parallel thereto which includes a switch actuated by the control pressure in the transmission, which switch closes above a predetermined control pressure. Finally, the brake light switch may serve according to the present invention as a brake-dependent switch which controls by means of a further intermediate relay the first branch of the energizing circuit of the shifting-up relay.

Accordingly, it is an object of the present invention to provide a drive arrangement for motor vehicles, especially for passenger motor vehicles, having an automatically shifting transmission which avoids by simple means the aforementioned shortcomings and drawbacks encountered in the prior art.

Another object of the present invention resides in a drive arrangement for motor vehicles, especially for passenger motor vehicles, having an automatically shifting transmission, which eliminates braking difficulties during the warm-up phase of the engine due to an artificially raised idling speed thereof.

A further object of the present invention resides in a drive arrangement for motor vehicles, especially for passenger motor vehicles having an automatically shifting transmission in which a strong creeping tendency in the idling speed during warm-up of the engine is effectively precluded, especially when the brake is engaged.

Still a further object of the present invention resides in a drive arrangement for motor vehicles having an automatically shifting transmission, in which the vehicle can be readily stopped by actuation of the brake notwithstanding a higher idling rotational speed due to warm-up of the engine, without loss of maneuverability of the vehicle.

Another object of the present invention resides in an installation for motor vehicles in which an overbraking of the wheels in the creeping condition is automatically avoided during actuation of the brake while the idling rotational speed of the engine is artificially raised during the warm-up phase.

Still another object of the present invention resides in a drive arrangement of the type described above in which during the engine warm-up phase, the transmission is automatically shifted to a higher speed upon actuation of the brake to thereby reduce the torque at the wheels.

A further object of the present invention resides in a drive arrangement of the type described above which not only avoids so-called shifting oscillations but also makes it possible to start the vehicle in a first speed range yet precludes an overbraking of the front wheels.

These and other objects, features, and advantages of the present invention will become more apparent from the following description when taken in connection with the accompanying drawing which shows, for purposes of illustration only, one embodiment in accordance with the present invention, and wherein:

The single FIGURE is a partial schematic view, partly in cross section, of the shifting arrangement for a planetary transmission which includes, inter alia, two brakes for its shifting operation, of which one brake in an engaged condition shifts the transmission into a second speed range and in a disengaged condition thereof shifts the transmission into a first speed range.

Referrring now to the single FIGURE of the drawing in which the transmission as well as its servo-devices are not illustrated in detail since they form no part of the present invention and are known as such in the art, the brake, mentioned hereinabove and not illustrated herein which in the disengaged condition shifts to the first speed range and in the engaged condition shifts to second speed range, is controlled from a command slide valve generally designated by reference numeral 11 by way of a brake line 10. In its illustrated left-end position the command slide valve 11 supplies a pressure medium to the brake line 10 and thereby engages the brake (not shown) with pressure, i.e., therefore shifts to second speed which is obtained as a result of engagement of the brake. In the right-end position of the command slide valve 11, the brake line 10 and therewith the brake is pressure-relieved, i.e., first speed is therefore obtained. The brake line 10 leading to the brake is additionally connected by way of a throttle 12 and a ball valve 13 with a space 14 on the right side of the command slide valve 11. The ball valve 13, on the other hand, is acted upon by a drive-velocity-dependent pressure determined by the positioning of a servo-slide member 15 which is acted upon by a control pressure existing in a line 16. The control pressure acts on both the right side of the servo-slide member 15 and also on a control pressure switch 17 whose function will be described more fully hereinafter. The working pressure is fed to the command slide valve 11 by a line 18 which is also connected with a kick-down solenoid controlling valve generally designated by reference numeral 21 by way of a throttle 19 and a line 20. The line 20 is normally closed by the kick-down solenoid controlling valve 21 but it is relieved to a zero pressure during an energization of the kick-down solenoid controlling valve 21. The kick-down solenoid controlling valve 21 is shifted in the usual manner by a kick-down switch 22 upon an actuation of the gas pedal (not shown).

A shifting-up relay 23 which opens when energized, is connected in parallel with the kick-down switch 22. The control pressure switch 17 is connected in an energizing circuit 24 of the shifting-up relay 23 and an auxiliary relay 26 to be energized by a brake light switch 25 is connected also in the energizing circuit 24 of the shifting-up relay 23 in parallel with the control pressure switch 17. The auxiliary relay 26 closes the energizing circuit 24 of the shifting-up relay 23 upon actuation of the brake light switch 25, which would occur during an actuation of the brake.

During the normal rolling out of the vehicle, i.e., when the vehicle is permitted to decelerate by itself with a non-actuated or released gas pedal, the oil pressure in the brake line 10 for the brake acts by way of the throttle 12 and a line 27 as well as the ball valve 13 on the right-end face of the command slide valve 11 and keeps the same in its left-end position for the second speed. During the rolling out of the vehicle, i.e., as the vehicle decelerates and approaches zero velocity or very low velocities, the control pressure in the lines 16 which is dependent on the driving velocity, now drops off until finally the control pressure switch 17 opens by a spring (not shown) normally biasing the control pressure switch to an open position. When the switch 17 opens, the current to the energizing circuit 24 is interrupted and the shifting-up relay 23 is de-energized or closed and the kick-down solenoid controlling valve 21 is energized. The kick-down solenoid controlling valve 21 now opens up and the lie 20 becomes therewith pressureless. As a result thereof, a control slide valve "overgas" generally designated by reference numeral 28 commences to operate and builds up pressure by way of a line 29 on the left side of the piston 32 at the command slide valve 11. This pressure, however, is initially incapable of displacing the command slide valve 11 toward the right against the oil pressure of the brake producing second speed and existing at the right-hand side of the command slide valve 11 so that the transmission remains in second speed during the rolling out and in standstill.

If the gas pedal valve 30 is now actuated slightly and therewith the slide member 30 is slightly displaced, the line 27 pressurizing the space 14 is relieved. The oil pressure at the brake and in the brake line 10 no longer acts on the ball valve 13 but instead the velocity dependent pressure in the line 31 determined by the servo-slide member 15, acts upon the ball valve 13. However, during standstill of the vehicle or at low travelling speed, the pressure in the line 31 is small so that the space 14 at the command slide valve 11 is relieved and the command slide valve 11 passes over into its right end position and the brake 10 is disengaged, i.e., first speed is therefore obtained. During the normal starting out of this position, the travelling speed of the vehicle increases and therewith the control pressure in the line 16 increases so that, when a specific minimum pressure in line 16 is exceeded, the control pressure switch 17 closes, resulting in an energeration of the shifting-up relay 23 which opens the energizing circuit of the kick-down solenoid controlling valve 21 which now closes. The left side at the piston 32 of the command slide valve 11 again becomes pressureless due to the pressure build-up in the line 20 and, consequently, due to the pressure decrease at the control slide member "overgas" designated by reference numeral 28. The driving-velocity-dependent pressure in the line 31 is now in a position to displace the command slide valve 11 against the control pressure out of the line 33 which comes into existence on the left at the command slide valve 11 by way of the cross and longitudinal bore. The brake is engaged by the pressure in brake line 10, and the transmission is shifted-up as a result thereof into second speed.

In the above-described position of the first speed, however, the creeping tendency of the vehicle is increased as a result of the greater geardown ratio. If now the brake is depressed in this condition, i.e., the brake light switch 25 is thus closed, then the auxiliary relay 26 is energized and closes the energizing circuit 24 of the shifting-up relay 23. Therefore, the shifting-up relay 23 opens in the already described manner the energizing circuit 24 of the kick-down solenoid controlling valve 21 so that the latter drops off, i.e., is de-energized. The line 20 is thus closed off and is again subjected to pressure in the manner described hereinabove. Consequently—as already described—the left side at the command slide valve 11 becomes pressureless, the slide member passes over into its left end position, and the brake 10 is engaged. The transmission passes over into second speed as a result thereof. The effect intended according to the present invention occurs, for in the second speed, the creeping tendency is considerably smaller. This condition continues as long as the brake is actuated. If the brake pedal is released, then the switch 25 opens, the auxiliary relay 26 drops off and interrupts the energizing circuit 24 at the shifting-up relay 23. The latter closes and the normal, already described operation with shifting back into first speed can again take place.

While we have shown and described only one embodiment in accordance with the present invention, it is understood that the same is not limited thereto but is susceptible of numerous changes and modifications as known to those skilled in the art, and we therefore do no wish to be limited to the details shown and described herein, but intend to cover all such changes and modifications as are encompassed by the scope of the appended claims.

We claim:

1. A drive arrangment for motor vehicles, comprising an automatically shifting transmission means and warm-up control means for raising the idling rotational speed of the driving engine during a warm-up phase, said transmission means including servo-means and command slide valve means, said servo-means being operable in a first position of the command slide valve means to be shifted into a position for the first speed of the transmission means and in a second position of the command slide valve means into a position for the second speed thereof, and kick-down solenoid controlling valve means operatively connected with the command slide valve means, said kick-down solenoid controlling valve means being operable to pass over in a shifting-down position upon an actuation of a kick-down switch, characterized in that a shifting-up relay means opening when energized, is connected in parallel to the kick-down switch, said shifting-up relay means including an energizing circuit, a further switch connected in said energizing circuit which is operable to close said energizing circuit upon actuation of a brake pedal in such a manner that the kick-down solenoid controlling valve means passes over into its shifting-up position during actuation of the brake pedal.

2. A drive arrangement according to claim 1, whereby the kick-down solenoid controlling valve means during energization results in operation of the command slide valve means into its position for the first speed by means of a pressure relief at a control slide valve means, characterized in that the parallelly connected shifting-up relay means in its non-energized position closes the energizing circuit of the kick-down solenoid controlling valve means.

3. A drive arrangement according to claim 2, characterized in that said further switch is connected in a first branch circuit of the energizing circuit of the shifting-up relay means, a second branch circuit being connected in parallel with said first branch circuit and including a control pressure switch actuated by a control pressure in the transmission means, said control pressure switch closing above a predetermined control pressure.

4. A drive arrangement with a brake light switch according to claim 3, characterized in that the brake light switch serves as a brake dependent switch which by means of a further auxiliary relay controls the first branch circuit of the energizing circuit of the shifting-up relay means.

5. A drive arrangment according to claim 1, whereby the kick-down solenoid controlling valve means during energization results in operation of the command slide valve means into its position for the first speed, characterized in that the parallelly connected shifting-up relay means in its non-energized position closes the energizing circuit of the kick-down solenoid controlling valve means.

6. A drive arrangement according to claim 1, characterized in that said futher switch is connected in a first branch circuit of the energizing circuit of the shifting-up relay means, a second branch circuit being connected in parallel with said first branch circuit and including a control pressure switch actuated by a control pressure in the transmission means, said control pressure switch closing above a predetermined control pressure.

7. A drive arrangement with a brake light switch according to claim 6, characterized in that the brake light switch serves as a brake dependent switch which by means of a further auxiliary relay controls the first branch circuit of the energizing circuit of the shifting-up relay means.

8. A drive arrangement for motor vehicles, including an automatically shifting transmission means, a warm-up control means for raising an idling rotational speed of the driving engine during a warm-up phase, and brake means for braking the vehicle, characterized by means for shifting the transmission means from first to second speed upon an actuation of the brake means during the warm-up phase of the engine while the idling rotational speed is artificially raised by said control means.

* * * * *